(12) United States Patent
Choi (10) Patent No.: US 11,741,691 B2
(45) Date of Patent: Aug. 29, 2023

(54) DISTRIBUTED LEARNING METHOD, SERVER AND APPLICATION USING IDENTIFICATION CARD RECOGNITION MODEL, AND IDENTIFICATION CARD RECOGNITION METHOD USING THE SAME

(71) Applicant: KakaoBank Corp., Seongnam-si (KR)

(72) Inventor: Ho Yeol Choi, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 0 days.

(21) Appl. No.: 17/637,904

(22) PCT Filed: Aug. 20, 2020

(86) PCT No.: PCT/KR2020/011112
§ 371 (c)(1),
(2) Date: Feb. 24, 2022

(87) PCT Pub. No.: WO2021/040318
PCT Pub. Date: Mar. 4, 2021

(65) Prior Publication Data
US 2022/0270355 A1      Aug. 25, 2022

(30) Foreign Application Priority Data
Aug. 30, 2019   (KR) .................. 10-2019-0107628

(51) Int. Cl.
*G06V 10/774*   (2022.01)
*G06V 10/82*    (2022.01)
*G06V 30/42*    (2022.01)

(52) U.S. Cl.
CPC .......... *G06V 10/7747* (2022.01); *G06V 10/82* (2022.01); *G06V 30/42* (2022.01)

(58) Field of Classification Search
CPC ......... G06V 10/40; G06V 10/82; G06V 10/22
See application file for complete search history.

(56) References Cited

U.S. PATENT DOCUMENTS

| 8,995,774 B1 * | 3/2015 | van Deventer ...... G06V 30/412 382/217 |
| 9,697,667 B1 * | 7/2017 | Cipriano ............. G06F 16/2455 |

(Continued)

FOREIGN PATENT DOCUMENTS

| KR | 10-2014-0010164 A | 1/2014 |
| KR | 10-1509399 B1 | 4/2015 |

(Continued)

OTHER PUBLICATIONS

International Search Report dated Nov. 6, 2020, issued in counterpart International Application No. PCT/KR2020/011112 (3 pages).

(Continued)

*Primary Examiner* — Ross Varndell
(74) *Attorney, Agent, or Firm* — WHDA, LLP (57) ABSTRACT

A distributed learning method of a server managing an ID card recognition model includes releasing an ID card recognition model performing at least one convolution operation on an ID card image captured in a user terminal so that the user terminal uses the ID card recognition model, receiving update information of the ID card recognition model generated according to an ID card recognition result of the released ID card recognition model, and verifying the update information received from the user terminal and updating the ID card recognition model using the verified update information.

12 Claims, 9 Drawing Sheets

(56) References Cited

U.S. PATENT DOCUMENTS

| | | |
|---|---|---|
| 10,089,521 B2 | 10/2018 | Kolleri |
| 10,242,283 B1 | 3/2019 | Jain et al. |
| 10,445,609 B1 | 10/2019 | Jain et al. |
| 10,475,442 B2 | 11/2019 | Lee |
| 10,482,343 B1 | 11/2019 | Jain et al. |
| 2004/0243832 A1 | 12/2004 | Wilf et al. |
| 2005/0188213 A1 | 8/2005 | Xu |
| 2015/0254519 A1 | 9/2015 | Kumar et al. |
| 2017/0148430 A1* | 5/2017 | Lee .................. G10L 15/16 |
| 2018/0068173 A1 | 3/2018 | Kolleri |
| 2018/0349685 A1 | 12/2018 | Kolleri |
| 2021/0064871 A1* | 3/2021 | Sohn .................. G06V 10/44 |

FOREIGN PATENT DOCUMENTS

| | | |
|---|---|---|
| KR | 10-2017-0061016 A | 6/2017 |
| KR | 10-2018-0092455 A | 8/2018 |
| KR | 10-2019-0020963 A | 3/2019 |
| KR | 10-2019-0075558 A | 7/2019 |
| KR | 10-2127171 B1 | 6/2020 |

OTHER PUBLICATIONS

Decision to Grant a Patent dated Jun. 16, 2020, issued in counterpart KR Patent Application No. 10-2019-0107628, w/ English translation (4 pages).

* cited by examiner

DISTRIBUTED LEARNING METHOD, SERVER AND APPLICATION USING IDENTIFICATION CARD RECOGNITION MODEL, AND IDENTIFICATION CARD RECOGNITION METHOD USING THE SAME

TECHNICAL FIELD

The present disclosure relates to a distributed learning method using an identification (ID) card recognition model, and more particularly, to a method for distributed learning of an ID card recognition model.

BACKGROUND ART

With the development of artificial intelligence (AI) technologies, the AI technologies have been applied to various fields. In particular, AI technology has mainly been applied to the field of detection and tracking of objects in images and has the advantage of being able to detect and track objects within a shorter time than that of the related art image processing.

The accuracy of an inference result of an artificial neural network model used in AI is significantly affected by a learning method and learning data. Therefore, in order to apply a developed neural network model to actual industrial fields, it is important to secure high-quality learning data in consideration of industrial characteristics and to properly train the neural network model accordingly.

That is, due to the importance of learning a neural network model, recently, various methods for generating new algorithms for learning, as well as the deep learning algorithm itself, and high-quality learning data have been developed. As an algorithm for learning, methods for adjusting a size of input data of a neural network model or appropriately adjusting the number of times of learning have been developed. In addition, as a method for generating learning data, various methods and conditions for increasing high-quality data have been devised.

Recently, the neural network model itself has been developed to be lightweight so as to be operated even in mobile terminals. Therefore, users may download various applications that analyze images based on the neural network model and extract various types of object information in images captured through user terminals.

That is, when the neural network model is driven in the user's terminal and objects in various images captured through the user's smartphone, for example, are detected, it is necessary to learn by reflecting the conditions of various environments used by users in a local aspect to increase the adaptability of the developed neural network model.

However, an image captured by a user may include the user's personal information, and the use of such an image by a central sever for learning may correspond to the use of personal information. That is, the unlimited use of personal information for learning the neural network model used in a mobile terminal without the user's consent may have a risk of personal information leakage and abuse, and more attention is required in the use of learning data.

Therefore, there is demand for development of a method that may use learning data, which is an essential condition for learning, based on a user terminal, and protect personal information included in the learning data, along with reducing a weight of the neural network model.

DISCLOSURE

Technical Problem

An object of the present disclosure is to provide an efficient learning and management method of a neural network model for ID card recognition.

Another object of the present disclosure is to propose a method for training an ID card recognition model based on various images captured locally.

Another object of the present disclosure is to propose a method of using selective information for training an ID card recognition model.

Technical Solution

According to an exemplary embodiment of the present disclosure, a distributed learning method of a server managing an ID card recognition model includes: releasing an ID card recognition model performing at least one convolution operation on an ID card image captured in a user terminal so that the user terminal uses the ID card recognition model; receiving update information of the ID card recognition model generated according to an ID card recognition result of the released ID card recognition model; and verifying the update information received from the user terminal and updating the ID card recognition model using the verified update information.

The update information may be generated using a user response for the ID card recognition result provided through the user terminal.

The receiving the update information of the ID card recognition model may include receiving weight change information of a layer performing the convolution operation as the update information by comparing an output value of the ID card recognition model with the user response.

The updating the ID card recognition model may include combining the received update information based on the layer or a version of the ID card recognition model and updating the ID card recognition model by verifying the combined update information.

The distributed learning method may further include: re-releasing the updated ID card recognition model to the user terminal, wherein the updating the ID card recognition model comprises updating the ID card recognition model using the received update information according to a release period of the released or re-released ID card recognition model.

The ID card recognition model may generate one-time update information by inputting a captured single ID card image.

The user terminal may perform a training process of training the ID card recognition model in a background environment by inputting the ID card recognition result reflecting the user response, and transmit the update information to the server.

According to an exemplary embodiment of the present disclosure, a distributed learning server of an ID card recognition model includes an ID card recognition model providing unit configured to release an ID card recognition model performing at least one convolution operation on an ID card image captured in a user terminal so that the user terminal uses the ID card recognition model, an update information receiving unit configured to receive update information of the ID card recognition model generated according to a result of recognizing an ID card of the released ID card recognition model, and an ID card recognition model updating unit configured to verify the update information received from the user terminal and updating the ID card recognition model using the verified update information.

The update information may be generated using a user response for the ID card recognition result provided through the user terminal.

The update information receiving unit may be further configured to receive weight change information of a layer performing the convolution operation as the update information by comparing an output value of the ID card recognition model with the user response.

The ID card recognition model updating unit may be further configured to combine the received update information based on the layer or a version of the ID card recognition model and update the ID card recognition model by verifying the combined update information.

The ID card recognition model providing unit may be further configured to re-release the updated ID card recognition model to the user terminal, and wherein the ID card recognition model updating unit may be further configured to update the ID card recognition model using the received update information according to a release period of the released or re-released ID card recognition model.

The ID card recognition model may generate one-time update information by inputting a captured single ID card image.

The user terminal may perform a training process of training the ID card recognition model in a background environment by inputting the ID card recognition result reflecting the user response, and transmit the update information to the server as a result of the training.

According to an exemplary embodiment of the present disclosure, a distributed learning method of an application including an ID card recognition model includes: receiving an ID card image; outputting an ID card recognition result using an ID card recognition model that performs at least one convolution operation on the input ID card image; training the ID card recognition model using the ID card recognition result and generating update information regarding the at least one convolution operation; and transmitting the update information to a server updating the ID card recognition model.

The update information may be generated using a user response for the ID card recognition result provided through the user terminal.

The generating the update information may include receiving weight change information of a layer performing the convolution operation as the update information by comparing an output value of the ID card recognition model with a user response.

The ID card recognition model may combine the update information transmitted in the transmitting operation based on the layer or a version of the ID card recognition model, and verify the combined update information to update the ID card recognition model according to a release period of the ID card recognition model.

Advantageous Effects

According to the present disclosure, a variety of learning data may be selectively used for learning, thereby increasing the performance of the ID card recognition model.

In addition, according to the present disclosure, the ID card recognition model may be trained by efficiently collecting prediction results of the ID card recognition model performed in each user terminal.

In addition, according to the present disclosure, personal information included in information input for prediction of the identification model recognition model may be protected and learned, so that damage due to leakage of the personal information may be prevented.

BEST MODE

The following description illustrates only a principle of the present disclosure. Therefore, those skilled in the art may invent various devices that implement the principle of the present disclosure and are included in the spirit and scope of the present disclosure although they are not clearly described or shown in the present specification. In addition, it is to be understood that all conditional terms and exemplary embodiments listed in the present specification are obviously intended only to allow those skilled in the art to understand a concept of the present disclosure in principle, and the present disclosure is not limited to the exemplary embodiments and states particularly listed as described above.

The above-mentioned objects, features, and advantages will become more obvious from the following detailed description provided in relation to the accompanying drawings. Therefore, those skilled in the art to which the present disclosure pertains may easily practice a technical idea of the present disclosure.

Further, in describing the present disclosure, in the case in which it is determined that a detailed description of a known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
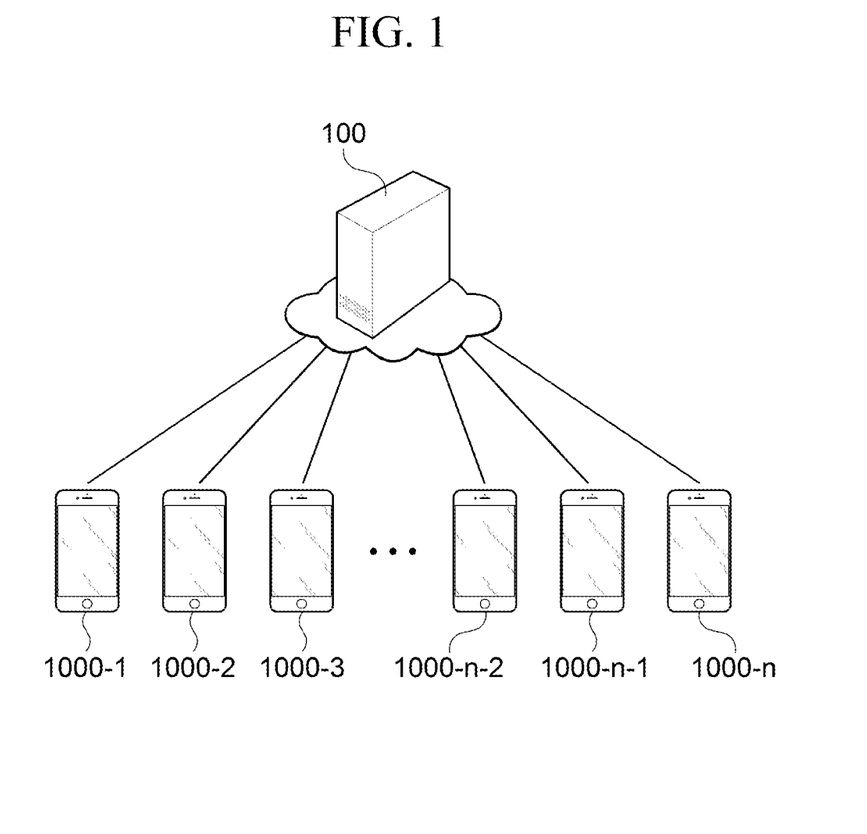
FIGS. 1 and 2 are diagrams illustrating a configuration of a system in which an ID card recognition model according to an exemplary embodiment of the present disclosure operates for learning.

FIG. 1 is a diagram illustrating a learning system in which a learning method of a deep learning-based ID card recognition model according to an exemplary embodiment of the present disclosure is performed.

Referring to FIG. 1, a learning system may include a management server 100 managing an ID card recognition model and a plurality of user terminals 1000: 1000-1 to 1000-n using the ID card recognition model.

The management server 100 may release a developed ID card recognition model 500 and train the ID card recognition model using a result of the released ID card recognition model. Specifically, the management server 100 may develop and manage a model for recognizing the user's identity information through an ID card image and release the model to a user terminal so that a user may more conveniently perform various tasks using the ID card.

For example, the management server 100 may be a server operated directly or indirectly by a financial institution, may release an application to provide tasks such as identification using an ID card required for an Internet banking service, account opening, and the like, and may include the ID card recognition model that recognizes an ID card in the application.

In the present exemplary embodiment, the user terminal 1000 may be a user's electronic device for performing ID card recognition and may be an electronic device including a camera module for ID card recognition and a communication module for communication with the management server 100. For example, the user terminal 10 may be a smartphone, a tablet, a PDA, or the like. Also, in some cases, the user terminal 10 may be a notebook computer, a desktop PC, or the like.

A user may download and install a banking application released from the management server 100 from an app store, etc., using the user terminal 1000, e.g., a smartphone, and use services such as Internet banking, and for tasks requiring identification, etc., and the user may capture an image of the ID card through the camera module.

An operation between the servers 100 and 200 and the user terminal 1000 according to an exemplary embodiment of the present disclosure is described in detail with reference to FIG. 2.

Figure 2:
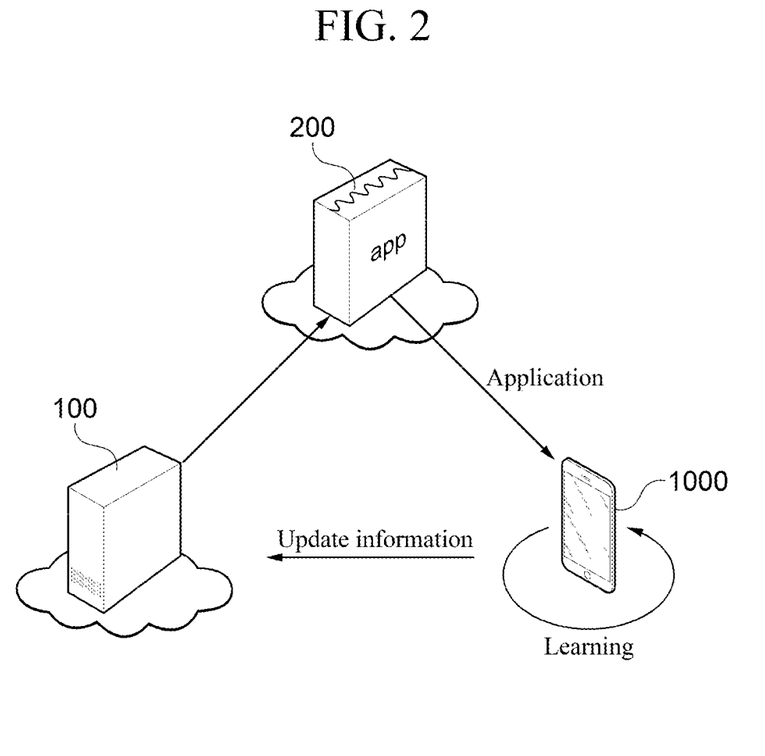

Referring to FIG. 2, as described above, the management server 100 releases an application including the developed ID card recognition model to the application server 200, and the released application may be managed according to a development version in the application server 200.

The user may access the application server 200 according to an operating system environment of the user terminal 1000 in use and download the distributed application.

The user may download the application, install the application in an operating system, and perform a business process provided by the application using various modules of the user terminal 1000.

For example, in this exemplary embodiment, for financial business, the user may download and install a banking application 900 released from the management server 100 of a bank in a mobile environment (e.g., Android, iOS, etc.), and perform tasks such as opening an account through the user terminal 1000.

In this case, in order to open an account in terms of general banking business, a procedure for identification is required, and for identification verification, the banking application 900 may capture an image of the user's ID card. Subsequently, the banking application 900 may request other organizations to verify whether personal information in an captured ID card matches information of the user. If the user and the personal information in the ID card match as a result of the verification, the user may continue to perform additional business processes.

Identification is checked by determining whether the information of the user's ID card captured through the user terminal 1000 matches the actual user's information, and here, the banking application 900 according to the present exemplary embodiment may use an ID card recognition model 500 so that the user terminal 1000 may directly recognize the user's information on the captured ID card for identification. Thus, the user does not need to type and input information, for example, name, address, resident number, etc. as the information on the ID card and may perform financial business more conveniently while on the move.

That is, the banking application 900 according to the present exemplary embodiment may include the ID card recognition model 500 trained in advance to recognize the ID card information so that the user may input ID card information in a more convenient mobile environment.

However, it is impossible for the management server 100 to learn by predicting all environments in which the user images the ID card, and thus, it is necessary to apply the ID card recognition model 500 to a real environment using a recognition result in an environment where the actual ID card is captured for learning.

Accordingly, in the present exemplary embodiment, the banking application 900 of the user terminal 1000 receives an ID card image captured by the user through an input unit 910, analyzes identification information in the input image through the ID card recognition model 500, and directly re-uses an analysis recognition result for learning at a local stage. Update information of the ID card recognition model according to the learning result may be transmitted from the user terminal 1000 to the management server 100 through a transmitting unit 920.

Hereinafter, a learning method according to the present exemplary embodiment is described in more detail.

Figure 3:
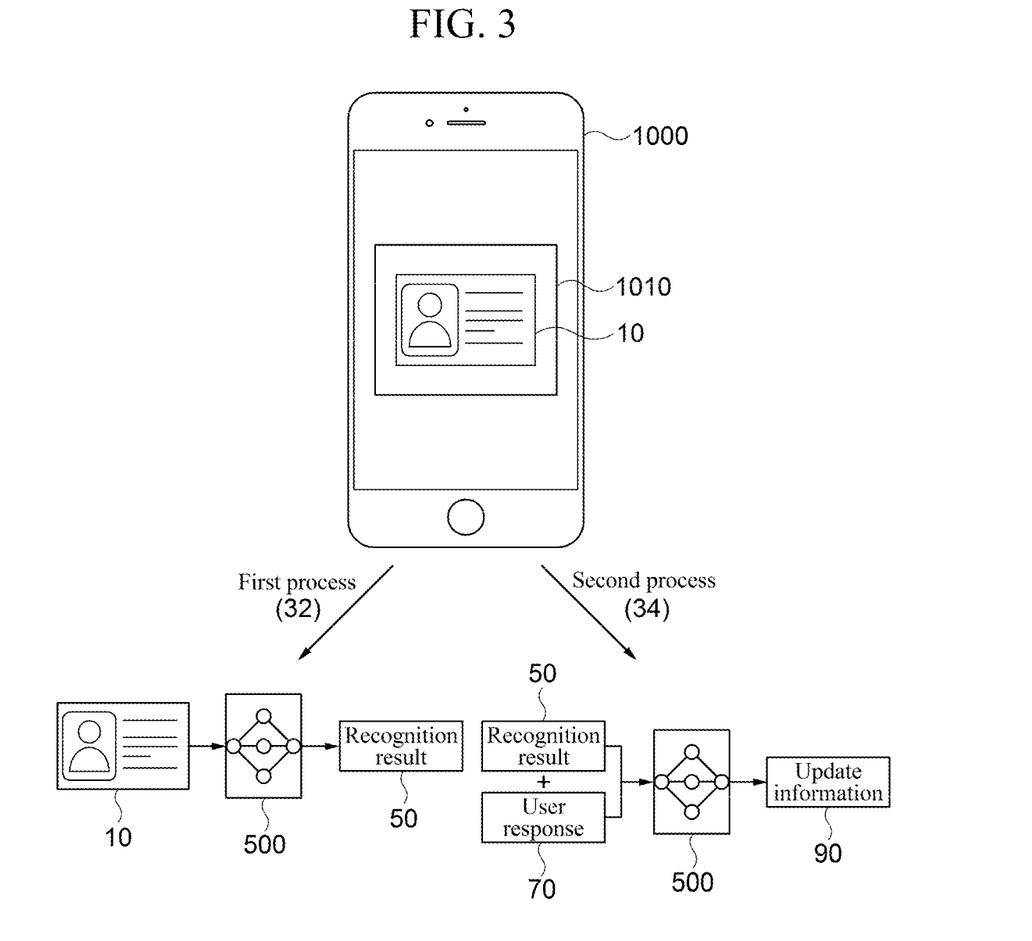
FIG. 3 is a diagram illustrating a process performed by the identification model recognition model in a user terminal according to an exemplary embodiment of the present disclosure.

Referring to FIG. 3, a method for recognizing an ID card in the user terminal 1000 and using the recognized ID card for training the ID card recognition model 500 according to an exemplary embodiment of the present disclosure is described.

Referring to FIG. 3, the user terminal 1000 includes a processor capable of performing a plurality of multi-processes, and the processor of the user terminal 1000 may run an application installed in a memory to perform an application task.

Figure 9:
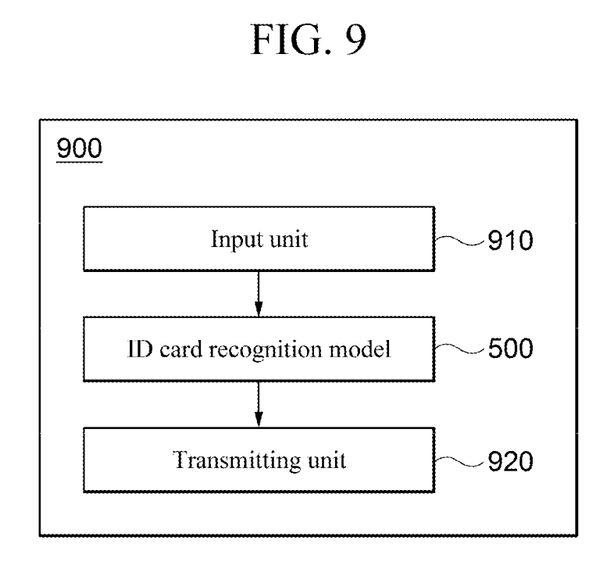
FIG. 9 is a diagram illustrating a mobile application according to an exemplary embodiment of the present disclosure.

As an exemplary embodiment, referring to FIG. 9 together, the banking application 900 running in the user terminal 1000 may perform an ID card authentication procedure during implementation of a financial service. The banking application 900 may provide an ID card imaging screen 1010 for imaging an ID card 10 using the camera module of the user terminal 1000. For example, the ID card imaging screen may include a guide box (or a guide line) in which the ID card is to be located, guidance words, and the like.

The input unit 910 of the banking application 900 may acquire an ID card image by recognizing the image captured through the camera module. The ID card image includes a captured image or video.

The input unit 910 may deliver the acquired data as an input value of the ID card recognition model 500, and the ID card recognition model 500 may receive and analyze the input value.

The ID card recognition model 500, as described above, is an algorithm or program for learning the ID card recognition process through data input through the input unit 910, and is also referred to as a deep neural network. The ID card recognition model 500 may further learn a previously designed model 500 using the captured ID card image as an input value and text data, which is a recognition result, as an output value.

As a first exemplary embodiment, in a first process 32, the ID card recognition model 500 may extract the ID card portion 10 in the input image 1010. In order to extract the ID card portion 10, it is also possible to perform processes such as ID card recognition and outline extraction using the previously trained ID card recognition model 500.

That is, in the first process 32, using image processing or other neural network models, the ID card portion 10 may be extracted and input to the ID card recognition model 500 trained for identification information recognition.

Figure 4:
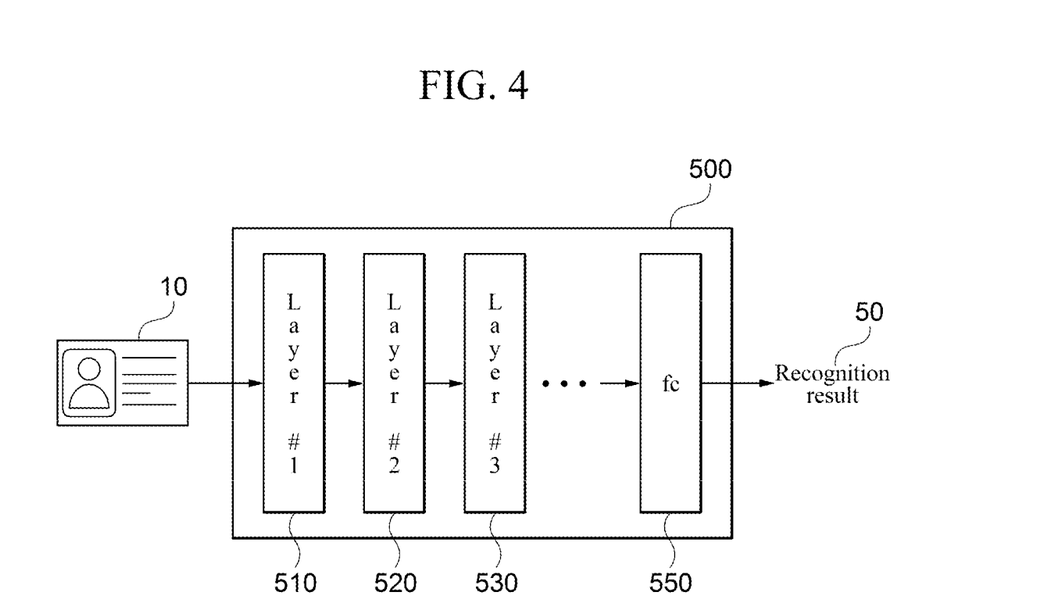
FIG. 4 is a diagram illustrating a structure of an ID card recognition model designed for ID card recognition according to an exemplary embodiment of the present disclosure.

A configuration of the ID card recognition model 500 is described in more detail with reference to FIG. 4. In this exemplary embodiment, the ID card recognition model 500 may be designed based on a convolution neural network (CNN) algorithm. The ID card recognition model 500 may include at least one or more layers 510, 520, and 530 performing convolution on the input image, and each layer may perform a convolution operation on pixel values by applying filters having various sizes to the input image.

As a performance result, a designed result such as the existence of an object, a location of the object, a meaning of the object, etc. may be finally output through a fully-connected layer 550, and in this exemplary embodiment, the ID card recognition model 500 may recognize and read the identification information written in the ID card in the input image and generate text information.

That is, the ID card recognition model 500 according to the present exemplary embodiment may extract the identification information 10 from the input ID card image and output the extracted text information as a recognition result 50. In addition, in the first process, the output recognition result may be transmitted to a server of an institution for identification to request verification, a result of the identification may be received, and an additional financial business process may be performed according to the identification.

Furthermore, in the first process 32, before the output recognition result is transmitted for identification, an additional request may be provided to the user to check the recognition result. That is, it is requested to verify the automatically recognized result through the ID card recognition model 500, and a user response regarding correction may be received.

Figure 5:
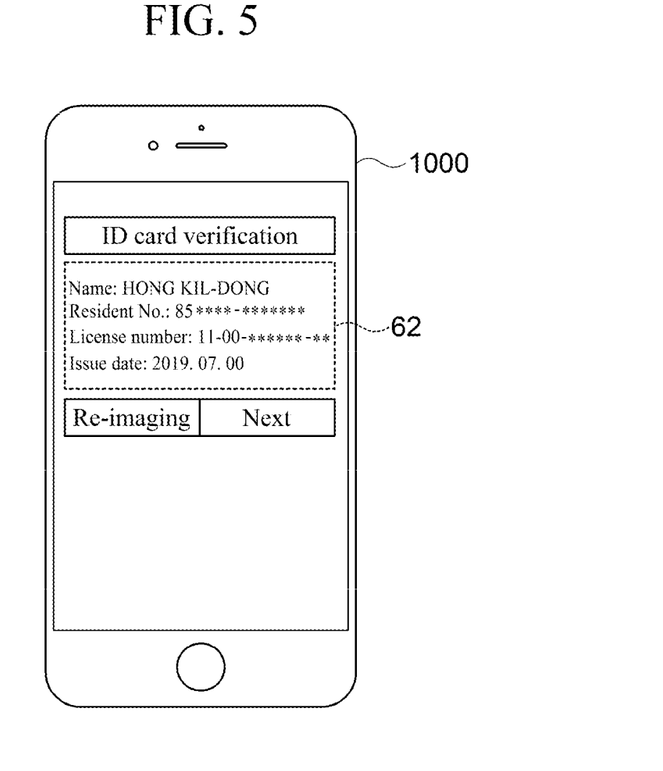
FIG. 5 is a diagram illustrating a request for checking a recognition result through an ID card recognition model according to an exemplary embodiment of the present disclosure.

That is, as shown in FIG. 5, the recognition result may be displayed 62 as text information to the user through a display module of the user terminal 1000, and it may be determined whether to perform imaging again for re-recognition. Alternatively, it is also possible to directly provide an interface so that the user may designate or correct an incorrectly recognized area.

Upon receiving the user's response to the recognition result through the above user interface, the user terminal 1000 may use the user's response to train the ID card recognition model 500 used for ID card recognition.

As a second exemplary embodiment, the processor of the user terminal 1000 may perform a second process 34 for training the ID card recognition model 500.

Through the second processor, the user's response 70 is reflected in the recognition result 50 of the ID card recognition model 500 for learning, and a correction value of a network of the ID card recognition model 500 which has caused an error value may be calculated based on a recognition result reflecting the user's response as an input of the ID card recognition model 500. Here, in order to correct the ID card recognition model 500, learning may be performed by calculating an error of a layer using a back-propagation process and updating a weight of a filter applied to the layer causing the error.

Alternatively, it is also possible to generate error values as update information 90 through a feed forward process of the recognition result 50 reflecting the user's response 70 as a final correct answer of the ID card recognition model 500. In this case, the user terminal 1000 transmits the generated error values to the management server 100, and the management server 100 may perform back-propagation to the network of a previous version of the ID card recognition model 500 using the received error values, and perform updating.

Furthermore, in the present exemplary embodiment, since the ID card recognition model 500 uses the result recognized in the ID card recognition process for the actual user to perform financial business for learning, the one-time update information 90 may be generated by inputting a single ID card image captured for learning.

Accordingly, in the present exemplary embodiment, the ID card recognition model 500 may recognize the ID card at the local stage in which the user terminal 1000 operates, and generate the update information 90 using the user response of the recognized result.

In addition, in the present exemplary embodiment, the process of recognizing an ID card and generating update information through learning is classified and expressed as the first and second processes, but the first and second processes may be sequentially performed and may be continuously performed in the same process. Alternatively, the first process may provide an interface to the user by interworking with the display module, and the second process of generating update information may be performed in a background environment and may be performed in parallel with the financial business process performed after identification.

Hereinafter, in terms of the management server 100 that manages the ID card recognition model 500, a method of managing the ID card recognition model 500 and performing updating using locally generated update information is described with reference to FIG. 6.

Figure 6:
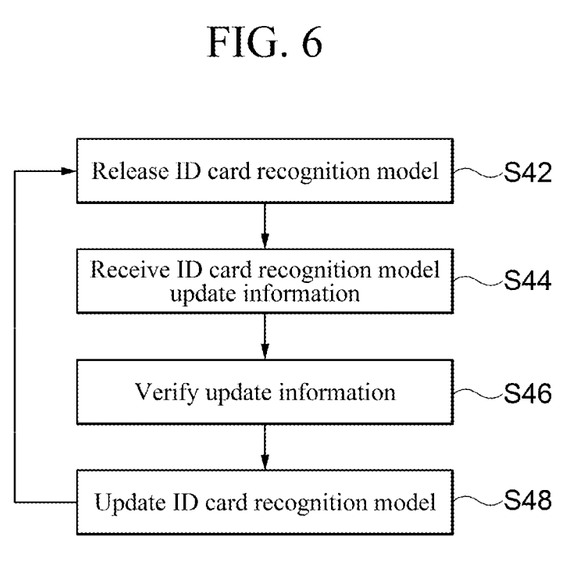
FIG. 6 is a diagram illustrating a learning method of an ID card recognition model according to an exemplary embodiment of the present disclosure.

Referring to FIG. 6, the management server 100 may release the ID card recognition model 500 (S42). Specifically, the banking application 900 including the ID card recognition model 500 may be developed and registered in the application server 200 to provide the ID card recognition model 500 to the user.

The user may download the registered banking application 900 through an application store and install the downloaded banking application 900 in the user terminal 1000 to proceed with financial business, and as in the example described above, the user may capture and recognize the ID card and generate one-time update information by inputting the captured single ID card image.

The generated update information may be transmitted to the management server 100, and the management server 100 may receive a plurality of pieces of update information generated at the local stage (S44).

In this case, the update information received by the management server 100 may be information generated by the user terminal 1000 and may be generated through a separate process as described above with reference to FIG.

3. That is, the user terminal 1000 may generate update information by performing a process of generating the update information of the ID card recognition model 500 using the user response of the captured ID card separately from the process of capturing and recognizing the ID card and performing identification. In this case, the update information may be an error value derived through a process predefined in the ID card recognition model 500 of the user terminal.

As described above, the banking application 900 trains the ID card recognition model 500 through the identification result data and the ID card image obtained from the input unit 910. In this case, the ID card recognition model 500 may generate update information as a result of learning, and transmit the update information to the transmitting unit 920.

When the transmitting unit 920 transmits the update information to the management server 100, the management server 100 may receive the update information and update the current version of the deep neural network. Thereafter, the management server 100 evaluates performance of the updated deep neural network (the ID card recognition model of the management server 100), and when the performance is improved, the management server 100 may release the updated network model to the user's application.

In addition, the user terminal 1000 may manage the ID card image and the ID card recognition result through an independent process separately from the update information, and may transmit only the update information to the management server 100.

Accordingly, the update information transmitted to the management server 100 may be configured to include only the correction information of the network of the ID card recognition model 500, without the ID card image and the information on the recognition result. In addition, it is also possible to delete personal information such as user identification information included in the update information and extract and generate information required only for updating the identification model 500 through an additional information processing procedure.

Through the above process, the user terminal 1000 may transmit the update information of the generated ID card recognition model 500, the management server 100 may receive only information for updating from the plurality of user terminals 1000, and the management server 100 may omit processing procedures for the use and protection of separate personal information for training of the ID card recognition model 500.

Next, the management server 100 may verify the update information received from the plurality of user terminals 1000 (S46). For verification, the management server 100 may check validity by comparing the update information with a predetermined reference and determine whether the update information includes a malicious code or other risk factors.

When the verification of the update information is completed, the server may update the ID card recognition model 500 (S48).

That is, when the update information generated as a result of distributed learning in the local stage is verified, the management server 100 may update the ID card recognition model 500 by collecting the update information (S48). The management server 100 may manage the ID card recognition model 500 by additionally setting criteria for collecting update information.

For example, when the management server 100 releases an application registered in the application store on a regular basis, the management server 100 may collect update information received for a unit period according to a release cycle and update the ID card recognition model 500 included in the current version of the application.

Alternatively, when an issue corresponding to a set event occurs irregularly, it is also possible to collect update information according to the issue and use the collected update information to update the ID card recognition model 500. For example, if a common counterfeit pattern of ID card is recognized or an ID card recognition error occurs due to a common cause, it is also possible to collect update information based on the corresponding pattern or cause and update the ID card recognition model 500.

Alternatively, when data having a certain size or greater based on a data size of the update information is collected, it is also possible to collect the received update information and use the received update information for updating.

Accordingly, the management server 100 may efficiently manage the update information generated in each user terminal 1000 periodically or in response to a specific event, and since the error value already learned and generated in the user terminal 1000 is applied to updating of the ID card recognition model 500, resources of the server may be used more efficiently.

Figure 7:
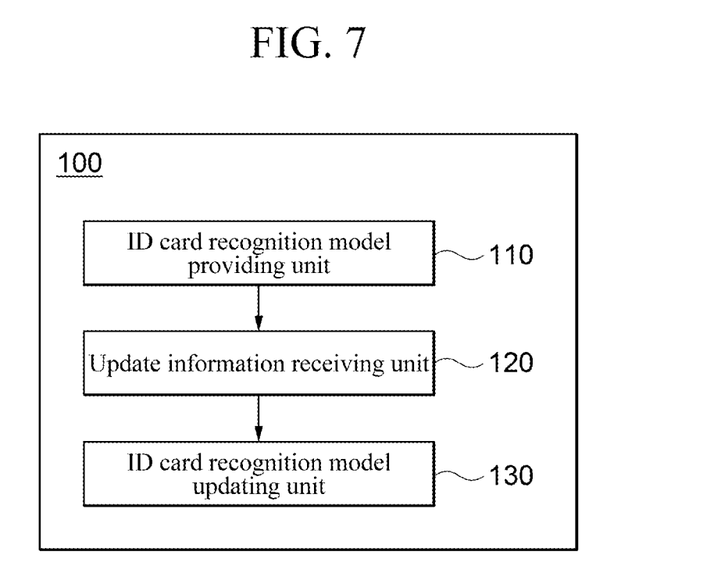
FIG. 7 is a diagram illustrating a server performing a learning method of an identification model recognition model according to an exemplary embodiment of the present disclosure.

Hereinafter, the management server 100 performing the learning method of the ID card recognition model 500 described above is described.

Referring to FIG. 7, the management server 100 according to an exemplary embodiment of the present disclosure includes an ID card recognition model providing unit 110, an update information receiving unit 120, and an ID card recognition model updating unit 130.

The ID card recognition model providing unit 110 may release the ID card recognition model 500 that performs at least one convolution operation on the ID card image captured by the user terminal 1000 so that the user terminal 1000 may use the ID card recognition model 500.

The ID card recognition model providing unit 110 may register an application for the user to use a service using an ID card image in an application store and release the application, or may directly provide the application. Alternatively, it is also possible to provide the application through a plug-in of a web browser or the like.

In this case, the ID card recognition model 500 may be included in the application and released, and the user may download and install the application to use various services based on the ID card recognition model 500.

The update information receiving unit 120 may receive update information of the ID card recognition model 500 that performs a convolution operation generated according to an ID card recognition result of the released ID card recognition model 500. Specifically, the update information transmitting unit may operate together with a communication module of the management server 100, and may receive the update information of the released ID card recognition model 500 through the user terminals 1000.

In this case, as described above, the update information may be generated to include an update value of a network of the ID card recognition model 500 without the ID card image and information on the recognition result through the processor of the user terminal 1000.

That is, the update information may include correction information of at least one or more layers constituting the network of the ID card recognition model 500 generated from the image input for ID card recognition of the ID card recognition model 500 and the output recognition result, and may include values that change a weight of a filter used for each layer.

In addition, the update information may include version information of the ID card recognition model 500 to be updated, and information on image capturing conditions used for image capturing, etc.

The ID card recognition model updating unit 130 may update the ID card recognition model 500 using the received update information. In addition, the ID card recognition model updating unit 130 may verify validity of the update information of the ID card recognition model 500 received before the updating, and update the ID card recognition model 500 using the verified update information.

The ID card recognition model updating unit 130 may receive the update information of the distributed ID card recognition model 500 from each user terminal 1000, collect the update information, and apply the collected information to the ID card recognition model 500 regularly or irregularly. For example, when a distribution cycle is determined, the ID card recognition model updating unit 130 may collect the update information collected for the current version of the ID card recognition model 500 and use the update information for updating.

In addition, since the update information of the ID card recognition model 500 may be generated for each layer constituting the network, it is also possible to collect the update information based on the layers and perform updating for each layer.

The ID card recognition model 500 updated through the above process reflects the results learned and performed locally, and has strong adaptability to the user's actual use environment.

The ID card recognition model providing unit 110 may release the updated ID card recognition model 500 so that the user terminal 1000 may use it.

In addition, the ID card recognition model providing unit 100 may perform a procedure of verifying performance in advance before releasing the updated ID card recognition model 500. In the case of the ID card recognition model 500 updated based on the update information generated by distributed learning, it may be necessary to verify the performance of the data captured in an actual new environment, so whether to release the updated ID card recognition model 500 may be determined through a predetermined performance verification process.

For example, it is also possible to generate an ID card image reflecting a main condition for generating an error value of update information used for updating as an input value and to determine whether an output value of the ID card recognition model 500 is correct or not, and release it.

In addition, the data for performance verification may be randomly generated and may be generated based on various image processing algorithms separately from the ID card image actually input from each user terminal 1000.

Figure 8:
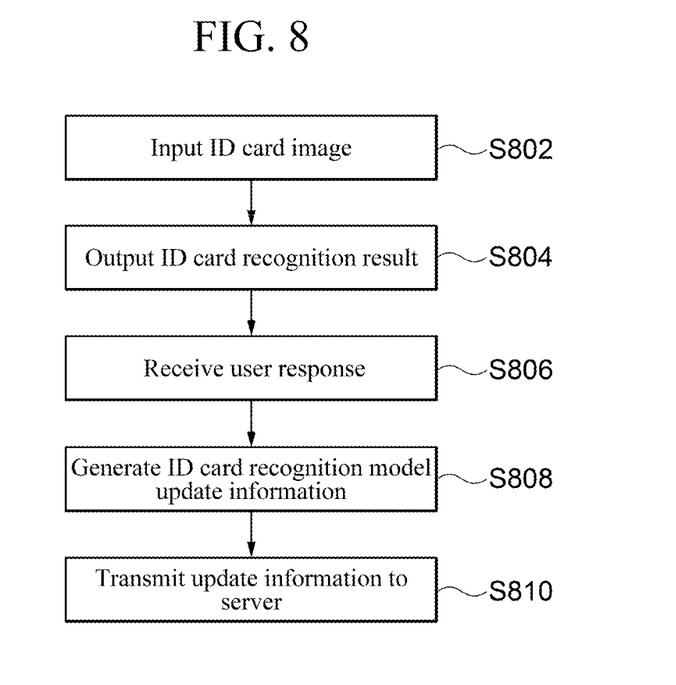
FIG. 8 is a diagram illustrating a process performed by a mobile application including an ID card recognition model for distributed learning in a user terminal according to an exemplary embodiment of the present disclosure.

Hereinafter, a process performed by an application including the ID card recognition model 500 for distributed learning on the user terminal 1000 according to an exemplary embodiment of the present disclosure is described with reference to FIG. 8.

First, an ID card image may be received to perform a task using the ID card image (S802). For example, when a task such as opening an account or the like is to be performed through a banking application, an ID card may be captured through the camera module of the user terminal 1000.

Along with the imaging of the ID card image, the application may perform ID card recognition using the ID card recognition model 500 that performs at least one convolution operation on the input ID card image, and output a recognition result through the display module as shown in FIG. 5 (S804).

Next, the user's response with respect to the output recognition result is received, and it is determined which recognition item has an error from the recognition result (S806).

The ID card recognition model 500 may be trained using the recognition result through another process of the user terminal 1000 and update information on the ID card recognition model 500 may be generated, in parallel with the ID card recognition process (S808).

Next, the user terminal 1000 may transmit the update information generated for updating the ID card recognition model 500 to the management server 100 for updating the ID card recognition model 500 (S810).

Hereinafter, a mobile application including the ID card recognition model 500 according to an exemplary embodiment of the present disclosure is described with reference to FIG. 9.

As an exemplary embodiment, the banking application 900 is an application program (or application software) installed and driven in the user terminal 1000, and is implemented to operate in conjunction with the management server 100.

The banking application 900 may include the input unit 910 receiving data through image capturing, etc., the ID card recognition model 500 that is an algorithm or program for learning an ID card recognition process through the input data, and the transmitting unit 920 transmitting a learning result to the management server 100.

Each of the components is modularized to perform a desired function using the devices of the user terminal 1000, and the banking application 900 including the ID card recognition model 500 released by the management server 100 may be stored and managed in a memory (not shown) of the user terminal 1000.

Figure 10:
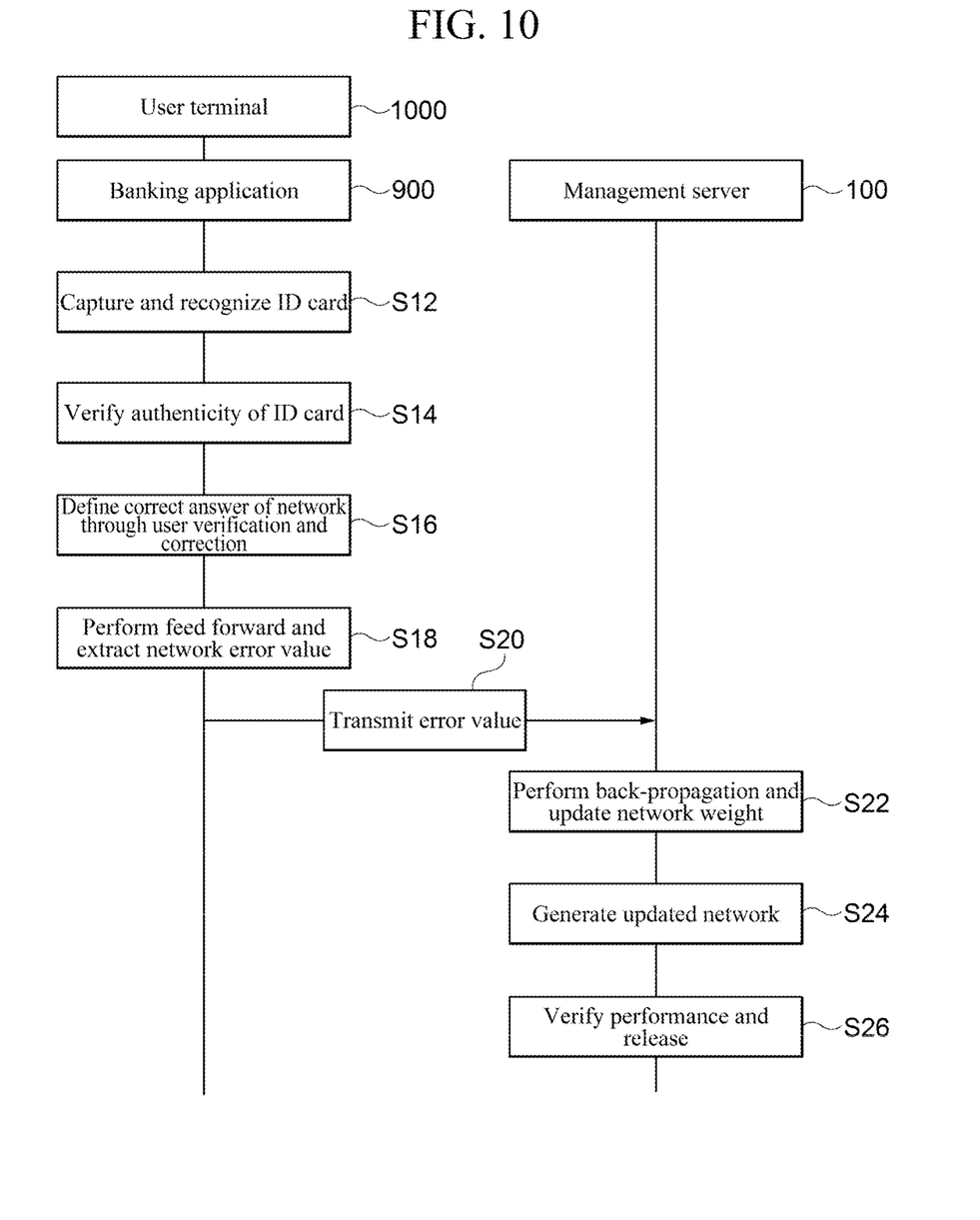
FIG. 10 is a diagram illustrating a method of updating an ID card recognition model according to an exemplary embodiment of the present disclosure.

Referring to FIG. 10, in order to update the ID card recognition model according to an exemplary embodiment of the present disclosure, the user terminal 1000 may capture an image of an ID card using the banking application 900 described above and recognize identification information included in the ID card (S12).

In this case, the banking application 900 may input the captured ID card image to an ID card recognition network (a base deep neural network) for ID card recognition, and determine authenticity of the captured ID card based on a value output from the network (S14).

In addition, the output value of the network may be provided to the user, and identification information (license number, name, resident number, etc.) whose authenticity is verified through the user verification may be defined as a final correct answer of the network (S16). When the output value is incorrect, the user may be requested to directly correct the identity information included in the output value, and user-modified identity information may be defined as a final correct answer.

A feed forward process is performed on the network of the user terminal using the defined final correct answer as an expected output value, and error values generated for each layer constituting the network are extracted (S18).

Next, each user terminal 1000 for distributed learning may independently perform the above process and transmit the extracted error value to the management server 100 (S20).

The management server 100 may finally update the weights of the ID card recognition network so that an error is minimized by performing back propagation using the transmitted error values (S22).

As described above, the management server 100 may collect error values transmitted from a plurality of user terminals based on a certain cycle or an event occurrence time, and update a common ID card recognition network therethrough.

When the modification of the weights of the previous version of the ID card recognition network is completed through the above updating process, a new version of the ID card recognition network may be generated (S24).

The management server 100 may additionally create a process for verifying the newly created ID card recognition network performance, and if advanced performance exceeding an expected value is recognized, the application including the verified ID card recognition network may be released again (S26).

According to the present disclosure, a variety of learning data may be selectively used for learning, thereby increasing the performance of the ID card recognition model 500.

In addition, according to the present disclosure, the ID card recognition model 500 may be trained by efficiently collecting prediction results of the ID card recognition model performed in each user terminal.

In addition, according to the present disclosure, personal information included in information input for prediction of the identification recognition model 500 may be protected and learned, so that damage due to leakage of the personal information may be prevented.

Various embodiments described herein may be implemented in, for example, a computer-readable recording medium or similar devices using software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented by a control module itself.

According to a software implementation, the exemplary embodiments such as procedures and functions described in the present specification may be implemented as separate software modules. Each of the software modules may perform one or more functions and operations described in the present specification. Software code may be implemented in software applications written in a suitable programming language. The software code may be stored in a memory module and may be executed by the control module.

The above description is merely illustrative of the technical idea of the present disclosure, and various modifications, changes, and substitutions may be made by those skilled in the art without departing from the essential characteristics of the present disclosure.

Accordingly, the exemplary embodiments disclosed in the present disclosure and the accompanying drawings are not intended to limit the technical idea of the present disclosure but to describe the present disclosure, and the scope of the technical idea of the present disclosure is not limited by the exemplary embodiments and the accompanying drawings. The protection scope of the present disclosure should be interpreted by the following claims, and all technical ideas within the equivalent scope should be interpreted as being included in the scope of the present disclosure.

The invention claimed is:

1. A distributed learning method of a server managing an ID card recognition model, the distributed learning method comprising:
   releasing an ID card recognition model performing at least one convolution operation on an ID card image captured in a user terminal so that the user terminal uses the ID card recognition model;
   receiving update information of the ID card recognition model generated according to an ID card recognition result of the released ID card recognition model;
   verifying validity by comparing the update information received from the user terminal with a predetermined reference and updating the ID card recognition model using the verified update information; and
   re-releasing the updated ID card recognition model to the user terminal,
   wherein the receiving the update information of the ID card recognition model comprises:
      receiving weight change information of a layer performing the convolution operation as the update information by comparing an output value of the ID card recognition model with the user response, and
   wherein the updating the ID card recognition model comprises:
      updating the ID card recognition model using the received update information according to a release period of the released or re-released ID card recognition model.

2. The distributed learning method of claim 1, wherein the update information is generated using a user response for the ID card recognition result provided through the user terminal.

3. The distributed learning method of claim 2, wherein the user terminal performs a training process of training the ID card recognition model in a background environment according to an input of the ID card recognition result reflecting the user response, and transmits the update information to the server.

4. The distributed learning method of claim 1, wherein the updating the ID card recognition model comprises:
   updating the ID card recognition model by verifying the received update information based on the layer or a version of the ID card recognition model.

5. The distributed learning method of claim 1, wherein the ID card recognition model generates one-time update information according to an input of a captured single ID card image.

6. A distributed learning server of an ID card recognition model, the distributed learning server comprising:
   an ID card recognition model providing unit configured to release an ID card recognition model performing at least one convolution operation on an ID card image captured in a user terminal so that the user terminal uses the ID card recognition model;
   an update information receiving unit configured to receive update information of the ID card recognition model generated according to a result of recognizing an ID card of the released ID card recognition model; and
   an ID card recognition model updating unit configured to verify validity by comparing the update information received from the user terminal with a predetermined reference and updating the ID card recognition model using the verified update information,
   wherein the ID card recognition model providing unit is further configured to re-release the updated ID card recognition model to the user terminal, wherein the update information receiving unit is further configured to receive weight change information of a layer performing the convolution operation as the update information by comparing an output value of the ID card recognition model with the user response, and wherein the ID card recognition model updating unit is further configured to update the ID card recognition model using the received update information according to a release period of the released or re-released ID card recognition model.

7. The distributed learning server of claim 6, wherein the update information is generated using a user response for the ID card recognition result provided through the user terminal.

8. The distributed learning server of claim 7, wherein the user terminal performs a training process of training the ID card recognition model in a background environment according to an input of the ID card recognition result reflecting the user response, and transmits the update information to the server.

9. The distributed learning server of claim 6, wherein the ID card recognition model updating unit is further configured to update the ID card recognition model by verifying the received update information based on the layer or a version of the ID card recognition model.

10. The distributed learning server of claim 6, wherein the ID card recognition model generates one-time update information according to an input of a captured single ID card image.

11. A distributed learning method of an ID card recognition model, the distributed learning method comprising:

receiving an ID card image;

outputting an ID card recognition result using an ID card recognition model that performs at least one convolution operation on the input ID card image;

training the ID card recognition model using the ID card recognition result and generating update information regarding the at least one convolution operation; and transmitting the update information to a server updating the ID card recognition model, wherein the generating the update information comprises:

generating weight change information of a layer performing the convolution operation as the update information by comparing an output value of the ID card recognition model with a user response, and wherein the ID card recognition model updates by verifying validity by comparing the update information received from a user terminal with a predetermined reference, and verifying the received update information based on the layer or a version of the ID card recognition model according to a release period of the ID card recognition model.

12. The distributed learning method of claim 11, wherein the update information is generated using a user response for the ID card recognition result provided through the user terminal.

* * * * *